(12) United States Patent  (10) Patent No.: US 6,173,423 B1
Autechaud et al.  (45) Date of Patent: Jan. 9, 2001

(54) DEVICE AND PROCESS FOR DETECTING ERRORS IN AN INTEGRATED CIRCUIT COMPRISING A PARALLEL-SERIAL PORT

(75) Inventors: Jean-François Autechaud, Paris; Christophe Dionet, Ivry sur Seine, both of (FR)

(73) Assignee: Bull, S.A., Louveciennes (FR)

( * ) Notice: Under 35 U.S.C. 154(b), the term of this patent shall be extended for 0 days.

(21) Appl. No.: 09/020,671

(22) Filed: Feb. 9, 1998

(30) Foreign Application Priority Data

Feb. 19, 1997 (FR) .................................................. 97 01944

(51) Int. Cl.$^7$ ...................................................... G06F 11/27
(52) U.S. Cl. .............................................. 714/703; 714/41
(58) Field of Search ..................................... 714/712, 703

(56) References Cited

U.S. PATENT DOCUMENTS

| | | | |
|---|---|---|---|
| 4,712,215 | * 12/1987 | Joshi et al. ................................ | 371/37 |
| 4,827,477 | * 5/1989 | Avaneas ................................... | 371/37 |
| 4,907,225 | * 3/1990 | Gulick et al. ......................... | 370/94.1 |
| 4,935,925 | * 6/1990 | Williams et al. ....................... | 370/83 |
| 5,394,390 | * 2/1995 | Stauffer et al. .......................... | 370/17 |
| 5,581,559 | * 12/1996 | Crayford et al. ..................... | 370/392 |
| 5,754,525 | * 5/1998 | Lo et al. .............................. | 370/94.1 |
| 5,907,566 | * 5/1999 | Benson et al. ....................... | 371/47.1 |

FOREIGN PATENT DOCUMENTS 2097653 3/1982 (GB) .

OTHER PUBLICATIONS

Patent Abstracts of Japan vol. 010, No. 223 (P–483), Aug. 5, 1986 & JP 61 059547 A (Yokogawa Hokushin Electric Corp), Mar. 27, 1986, Abstract.

Patent Abstracts of Japan vol. 008, No. 269 (P–319), Dec. 8, 1984 & JP 59 136843 A (Yokogawa Hokushin Denki KK), Aug. 6, 1984, Abstract.

C.J. Georgiou et al.: "Scalable Protocol Engine For High Bandwidth Communications", 1997 IEEE Int. Conf. On Communications, vol. 2, Jun. 8, 1997, Montreal, Quebec, Canada pp. 1121–1126, XPOO2060851.

Richard Nass: "Fibre Channel Transceiver UPS Bandwidth, Maintains Design Ease." Electronic Design, vol. 45, No. 10, May 12, 1997, USA, pp. 69–72, XP000698867.

G.R. Stephens et al.: Fibre Channel The Basics 1995, Ancot Corp., Menlo Park, CA., USA XP002060314, pp 1–0—1–14 6–0—8–17.

C.J. Hossack et al.: "Fully Interconnected Fault–Tolerant Networks Using Global Link Adapters"Transputer Applications And Systems '94, Sep. 5, 1997, Como, Italy, pp. 489–496, XP002060313.

* cited by examiner

*Primary Examiner*—Stephen M. Baker
(74) *Attorney, Agent, or Firm*—Miles & Stockbridge P.C.; Edward J. Kondracki

(57) ABSTRACT

A device for detecting errors with an integrated self-check, on an integrated circuit comprising a serial link control function for constituting an input-output port (109) between a parallel bus (L2CB, C2LB) and a serial link. The integrated circuit comprises a serializer circuit (109$_T$) on output and a deserializer circuit (109$_R$) on input. An insertion buffer I-sb has each of its outputs connected to one input of an exclusive OR operation with two inputs. The second input of the exclusive OR operation receives a piece of information (o-s) to be transmitted in order to constitute, with the insertion information issuing from the insertion buffer, a piece of substitute information. An additional buffer (I-tb) makes it possible to compare the sequence supplied as output from the exclusive OR with a sequence stored in the additional buffer (I-tb) in order to validate the transmission of the substitute sequence. A history buffer (HIB) stores characters received from the deserializer and makes it possible to diagnose the error.

21 Claims, 7 Drawing Sheets

CRC is updated

Data= D1  D2  D3  D4  D5  D6  D7  D8  D9 after N bytes:

$CRC_N$=R16 R15 R14 R13 R12 R11 R10 R9 R8 R7 R6 R5 R4 R3 R2 R1 after N+1 bytes:

| $CRC_N$= | S16 | S15 | S14 | S13 | S12 | S11 | S10 | S9 | S8 | S7 | S6 | S5 | S4 | S3 | S2 | S1 |
|---|---|---|---|---|---|---|---|---|---|---|---|---|---|---|---|---|
| | = | = | = | = | = | = | = | = | = | = | = | = | = | = | = | = |
| | | | | | | | | | | R16 | R15 | R14 | R13 | R12 | R11 | R10 |
| | X9 | X8 | X7 | X8 | X7 | X6 | X5 | X4 | X3 | X2 | X1 | | | | | X9 |
| | X8 | X7 | X6 | X7 | X6 | X5 | X4 | X3 | X2 | X1 | | | | | | X8 |
| | X7 | X6 | | | | | | | | | | | | | | X7 |
| | X6 | X5 | | | | | | | | | | | | | | X6 |
| | X5 | X4 | | | | | | | | | | | | | | X5 |
| | X4 | X3 | | | | | | | | | | | | | | X4 |
| | X3 | X2 | | | | | | | | | | | | | | X3 |
| | X2 | X1 | | | | | | | | | | | | | | X2 |
| | X1 | | | | | | | | | | | | | | | X1 |

(With Xi=Di ⊕ Ri=Di XOR Ri)

FIG. 5

DEVICE AND PROCESS FOR DETECTING ERRORS IN AN INTEGRATED CIRCUIT COMPRISING A PARALLEL-SERIAL PORT

BACKGROUND OF THE INVENTION

1. Field of the Invention

The present invention relates to a device and a process for detecting errors in an integrated circuit comprising a parallel-serial and serial-parallel port.

2. Description of Related Art

Integrated circuits are known which comprise interfaces between a parallel bus and a serial bus, but in general these do not include a device and process for detecting and recovering from errors, since they are based on the assumption that the communication does not comprise any errors involving the serial link, or if it does comprise any, the detections of errors and recoveries from errors are handled in a higher layer (synchronization loss) at the software level.

SUMMARY OF THE INVENTION

In the invention, the serial link is a 1-gigabaud serial link, and it is assumed that two ports of the same type are communicating with one another through the serial link. It is further assumed that machines whose error rate in terms of message corruption and calibration loss and/or protocol inconsistency is on the order of $10^{-17}$ communicate with one over the link. It is noted, taking into account the speed of the serial link and the error rate of the machine, that this seemingly low error rate can result in a substantial error and an abnormal operation of the machine every two days.

Therefore, a first object of the invention is to provide a serial-parallel link interface in both directions for an integrated circuit, thus allowing the detection of errors and the verification of the proper operation of the communication over the serial-parallel link.

This object is achieved due to the fact that the error detecting device is in an integrated circuit comprising a serial link control function constituting an input-output port between a parallel bus and a serial link. The integrated circuit comprises a serializer circuit on output and a deserializer circuit on input and includes an insertion buffer has each of its outputs connected to an exclusive OR operation with two inputs, each second input of which receives a piece of information to be transmitted in order to constitute, with the insertion information issuing from the insertion buffer, a piece of substitute information, and an additional buffer that makes it possible to compare the sequence supplied as output from the exclusive OR with a sequence stored in the additional buffer, in order to validate the transmission of the substitute sequence.

According to another characteristic, the additional buffer includes a validity bit and the sequence to be compared.

According to another characteristic, the sequence to be compared can be a token, a CRC, data, ends of frame, an idle message or idle character.

According to another characteristic, the port comprises a serial link that loops the output of the serializer back to the input of the deserializer, which serial link is validated by a loop command entry supplied by a control register.

According to another characteristic, the port comprises on output from the deserializer a history buffer that stores either the last 16 control characters coming from the serial link through a decoder, or the last 16 control characters except for the idle characters.

According to another characteristic, the characters stored in the history buffer are used by the integrated circuit to determine the cause of a detected error.

According to another characteristic, the port comprises at least one incoming buffer (TDBUT) for data to be transmitted from the parallel bus and at least one outgoing buffer (RDBUF) for data to be received, and comprises, between the at least one incoming buffer (TDBUF) and the outgoing serializer circuit, and between the at least one outgoing buffer (RDBUF) and the incoming deserializer, respectively, a CRC code generating circuit for each respective transmitting part and a CRC code checking circuit for each respective receiving part.

According to another characteristic, the serializer and deserializer circuits run at 1 gigabaud, the speed of the serial link.

According to another characteristic, the CRC generating circuit delivers a 16-bit word by using a cyclic permutation algorithm to calculate the CRC after the shift corresponding to the control of a nine-bit byte.

According to another characteristic, the data transmitting or receiving buffers (TDBUF, RDBUF) run on the system clock having a frequency that corresponds to the frequency of the internal bus of the integrated circuit.

According to another characteristic, a serially transmitting 9/12 encoder circuit is coupled with the serializer, and a receiving 9/12 decoder circuit is coupled with the deserializer in order to transform a normal 9-bit character and a control character into 12-bit code which, on reception, allows the extraction of the clock signal and an idle DC component from the transmission.

Another object of the invention is to provide a process for detecting errors.

This object is achieved due to the fact that the process for detecting errors in a high-speed serial-parallel communication port and a CRC circuit comprising an error injecting mechanism is characterized in that it comprises:

a step for sending to the port a piece of information to be transmitted;

a step for calculating the CRC from the information to be transmitted and for storing the CRC corresponding to the information to be transmitted;

a step for generating a piece of erroneous information by validating the error injecting mechanism, and a step for transmitting the erroneous information to an integrated circuit equipped with the same type of port;

a step for detecting data errors by means of the CRC checking circuit of the receiving port;

a step for sending an interrupt message to the integrated circuit of the transmitting port;

a step for reading, by means of a microprocessor connected to the parallel bus of the transmitting port, the value calculated by the CRC circuit of the receiving port;

a step for comparing the stored value to the read value.

According to another characteristic, the process includes a step for looping the transmitting serializer circuit back to the receiving deserializer circuit of the same port of the integrated circuit.

According to another characteristic, the error injecting mechanism comprises:

a step for storing, in an injection buffer, injection information to be combined with the transmitted information so as to generate the error;

a step for loading an activation buffer of the injecting mechanism comprising a sequence of one or two characters;

a step for substituting the substitute information resulting from the combination of the transmitted information with the injection information as soon as the transmitted information corresponds to the information from the activation buffer.

According to another characteristic, the length of the substitute sequence is limited to 8 characters.

BRIEF DESCRIPTION OF THE DRAWING(S)

Other characteristics and advantages of the present invention will emerge more clearly with a reading of the description below, given in reference to the appended drawings illustrating a non-limiting embodiment of the invention, in which:

FIG. 5 represents the mechanism for calculating the cyclic redundancy check code (CRC).

DESCRIPTION OF THE PREFERRED EMBODIMENT(S)

Figure 1:
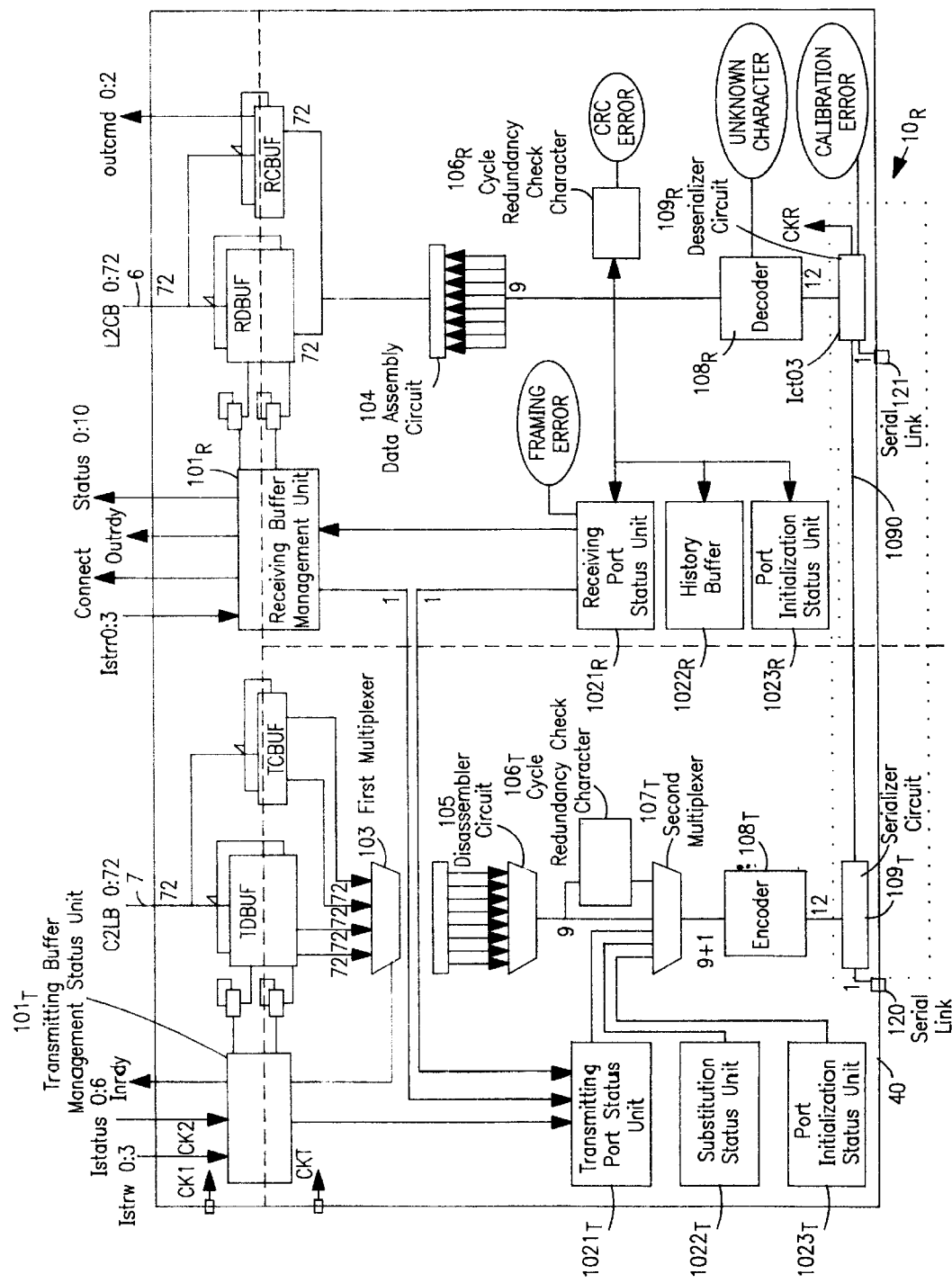
FIG. 1 represents the part of the integrated circuit that constitutes the serial-parallel interface port.
Figure 2A:
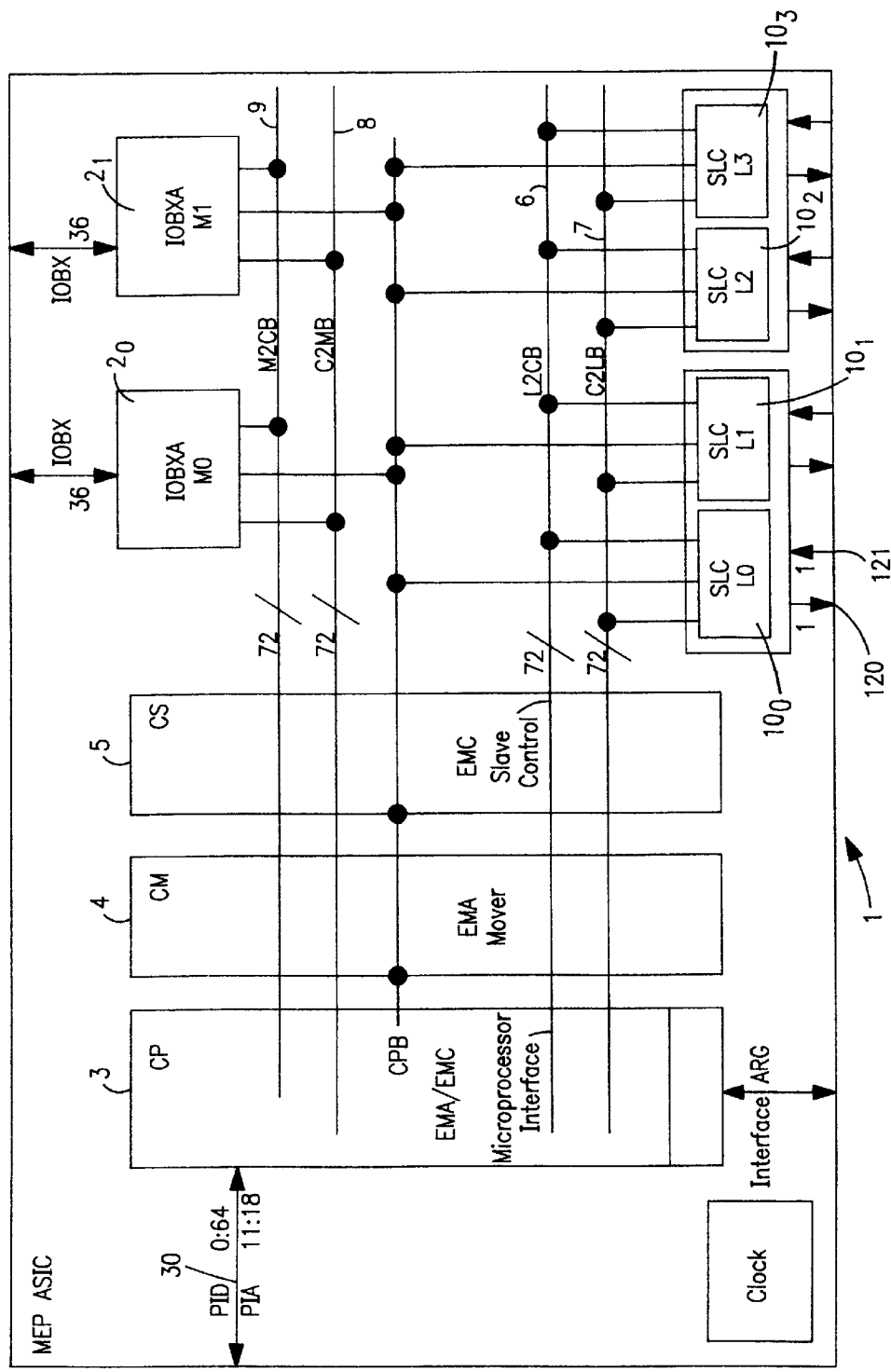
FIG. 2A represents the general block diagram of an integrated circuit incorporating an interface port of this type.
Figure 2B:
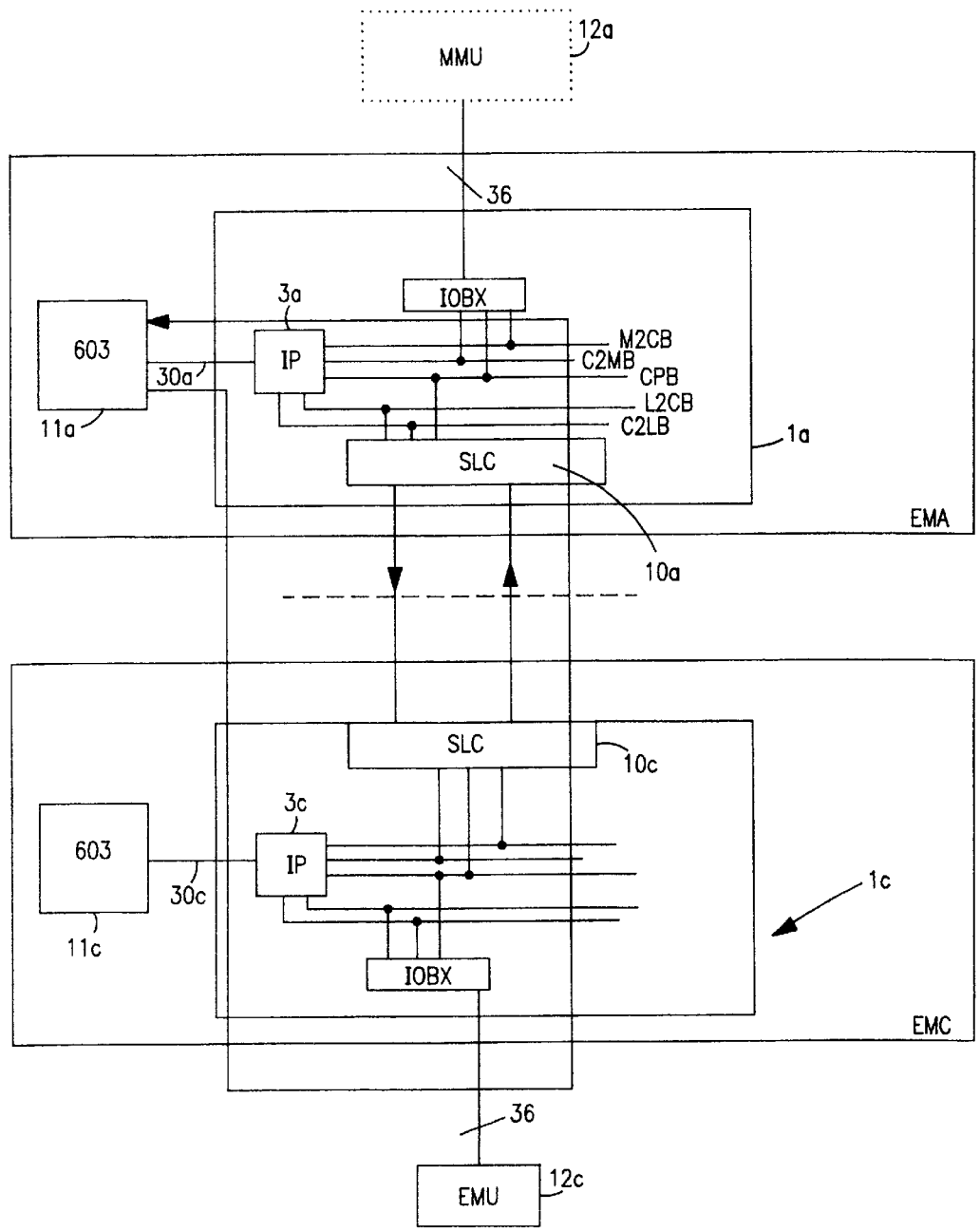
FIG. 2B represents the architectural diagram of a machine using an integrated circuit of this type.

The port $10_0$, called a serial link control block SLC, is incorporated into an integrated circuit, for example of the type represented in FIG. 2A. This integrated circuit (1) comprises a plurality of ports $10_0$, $10_1$, $10_2$, $10_3$ of the same type as that in FIG. 1, which communicate at a system frequency of, for example, 33 MHz with two 72-bit parallel data busses L2CB (6) on input and C2LB (7) on output. These parallel busses communicate with logical circuits that provide, for the circuit (3), a functionality for interfacing with a microprocessor (11) through a 64-bit bus (30), for the circuit (4), a mover functionality (MOVER) for the integrated circuit when the latter is incorporated into a data-type card, and for the circuit (5), a storage controller (Slave Control). These circuits (3, 4, 5) also communicate through two 72-bit data busses M2CB (9), C2MB (8) with two input-output interfaces IOBX $2_0$, $2_1$, which allow communication with 36-bit busses issuing either from a main memory unit MMU (12a, FIG. 2B), or from an expanded memory unit EMU, as shown in FIG. 2B. A control bus CPB allows the microprocessor (11) communicating with the integrated circuit (1) to access the control and status registers of the various circuits (3, 4, 5, 2, 10) present in the integrated circuit. This integrated circuit (1) is used in a machine comprising a main memory (12a), and an expanded memory (12c) which can be shared by several systems. A first, master integrated circuit (1a) according to the invention communicates through the bus (30) with a first processor (11a) and through the interface IOBX with the memory (12a), while a second, slave integrated circuit (1c) communicates with the first master circuit (1a) and, through the bus (30a), with a second processor (11c) and with an expanded memory (12c). The parallel-serial transmitting and serial-parallel receiving port (10a) of the circuit (1a) comprises, for the transmitting part, a pair of 8×72-bit data buffers TDBUF connected to the transmitting bus C2LB. A multiplexer (103) makes it possible to select either the buffer TDBUF or the control signal buffer TCBUF, which contains the header. The information issuing from the multiplexer (103) is sent to a disassembler circuit (105), which generates a sequence of 9-bit characters constituting the characters to be transmitted. This disassembler circuit (105) is also connected to a circuit for generating a cyclic redundancy check character CRC ($106_T$) A second multiplexer (107) makes it possible to direct the transmitted signals to an encoder ($108_T$) which allows the transmitted information to be 9/12 encoded by associating a control character with the normal character formed by a nine-bit byte and by padding it to 12 bits with a start character and a stop character. The 9/12 encoding is carried out so that the signal transmitted through the serial line does not include any DC component (DC Balance). The multiplexer (107) receives signals issuing from a serial link transmission status unit ($1021_T$), which contains at least one counter with 2 token bits, wherein each bit representing a token indicates the availability of the associated buffer. The multiplexer (107) receives signals issuing from a substitution status unit ($1022_T$), and signals issuing from a port initialization status unit ($1023_T$). The output of the encoder ($108_T$) is connected to a serializer circuit ($109_T$) whose output constitutes a serial line (120) that sends signals at a speed of 1 gigabit/sec.

The serializer is connected by a serial loop link (1090) to a deserializer ($109_R$) of the receiving circuit of the port (100). This link (1090) is validated in the deserializer ($109_R$) by a signal (Ict03).

The multiplexer (107) also receives the signals from a transmission status unit. Each transmitting buffer is controlled by a transmitting buffer management status unit ($101_T$), which receives Istatus 0:6, Istrw 0:3, and sends the signal Inrdy.

The deserializer ($109_R$) is connected to a decoder ($108_R$) that operates on the same principle as the encoder ($108_T$) of the transmitting circuit. This decoder of the receiving circuit sends the 9 bits of each datum to a data assembly circuit (104) in order to transform into a 1×72, 3×72, 8×72, or 9×72-bit message the data received serially, which is loaded into a pair of data receiving buffers (RDBUF). This pair of data receiving buffers (RDBUF) is controlled by a receiving buffer management unit ($101_R$), and is associated with a pair of receiving control buffers (RCBUF) which contain the headers of the messages. The output of the decoder ($108_R$) of the receiving circuit is branched to a message verification code circuit that generates a cyclic redundancy check character CRC ($106_T$) for comparison. The $CRC_{N+1}$ is updated after each reception of 9 data bits, by extending the CRC to 16 bits using a cyclic permutation algorithm, shown in FIG. 5, on the values $X_i$ calculated from the data received $D_i$ and the values $R_i$ of the bits of the preceding $CRC_N$, according to the formula given in FIG. 5. The information transmitted by this decoder ($108_R$) is also transmitted to a status unit constituting a history buffer ($1022_R$), to a receiving port status unit ($1021_R$), and lastly, to a port initialization status unit ($1023_R$)

The receiving buffer management status unit ($101_R$) sends three signals (Connect, Outrdy, Status 0:10) and receives as input on three lines the information (Istrr 0:3).

The signal (Outrdy) indicates that the output is ready; this signal indicates that there is a complete message waiting to be read. The signal Status indicates the status of the outputs: whether or not there are interruptions, whether or not there are indivisible operations, memory access/access registers, local/remote or ISCON/non-ISCON, microprocessor/mover (MOVER)/slave (SLAVE) source, whether or not there are delayed responses, whether or not it is the last message, whether or not there is a data error, whether or not there is external memory access, and whether or not there is an insignificant message. The output Connect indicates that the port SLC ($10^0$) is disconnected when this output is deactivated.

The inputs Istrr allow the reading of the receiving ports in FIFO order, and the command that reads the last double-word of a message initiates the generation of a flow control character (token) associated with the buffer, which thus becomes free. This flow control character is transmitted from the receiving buffer management status unit ($101_R$) to the transmission management status unit, and through the latter to the multiplexer (107) in order to transmit this information to the entry port (10c) of the card (1c) associated in the serial link with the receiving port ($109_R$) in which the receiving buffers (RDBUF) have just been read. The transmitting buffer management status unit ($101_T$) comprises two inputs Istatus and Istrw, and one output Inrdy. This output Inrdy indicates that there is a free transmitting buffer (TDBUF) waiting to be written. The lines Istatus make it possible to specify the types of messages to be written, and to determine, as a function of the value of the first two status bits, the following indications: 00 not used, 01 data only, 10 header, 11 header and data. The third bit Istatus indicates whether or not this is the last message. The fourth bit indicates whether or not there is a data error, the fifth bit whether or not there is external access to the memory.

Lastly, the signal Istrw makes it possible to write the transmitting buffers (TDBUF) in FIFO order. The signal Istrw, which writes the last double-word of a message, initializes the transmission of the message as soon as a receiving buffer (RDBUF) that is remote (for example from the port 10c) is declared to be free by a receiving port ($109_R$) connected to the serial link (120).

The history buffer (I-HB) has 16 inputs and contains either the last 16 characters coming from the serial link through the decoder ($108_R$) or the last 16 control characters except for the idle characters. When an error occurs in the serial link, the write in the history buffer can be disabled by a specific command and the reading of the buffer is carried out by means of a pointer (PHB) that allows a cyclic scanning of the buffer controlled by the microprocessor (11). The history buffer is controlled by a control register (ICL1) (FIG. 4B) connected to the control bus CPB.

The history buffer IHB is accessible to the microprocessor (11a, 11c) through the control bus CPB. The control register ICL1 is connected to 2 filters (F1, F2). The first F1, when it is activated by ICL1, allows only the control characters to pass, and when it is not activated, is transparent. The second filter F2 allows all the non-idle characters to pass.

The substitution status unit ($1022_T$) (FIG. 4A) comprises a substitution buffer (I-sb) that has eight inputs, and its content is combined in an exclusive OR (10221) with the outgoing stream (o-s) of characters into a length of 7 characters.

The substitution begins with the last character of an activation sequence. The character of the outgoing stream (o-s) corresponding to the last valid character of the transmitting buffer TDBUF is combined in an exclusive OR gate with the first character of the substitution buffer (I-sb).

In an operation without substitution, the reading pointer PL of the substitution buffer (I-sb) addresses the first character of the substitution buffer (I-sb). This character, which is idle, when combined in the exclusive OR (10221) with the characters of the stream (o-s), does not modify these characters, and the stream (o-s) is transmitted to the multiplexer (107).

An activation buffer (I-tb) with two inputs determines by its content when the substitution burst starts. This buffer I-tb sends the activation sequence tc to an associated comparator (10222) which receives through its other inputs the outgoing stream (o-s). This start time is given when the activation sequence (tc) corresponds to the outgoing character stream (o-s).

In this case the output (10224) from the comparator activates the incrementer (10223) of the reading pointer PL so as to make it possible to send, simultaneously with each new character of the outgoing stream, a substitute character addressed among the 8 characters of the buffer I-sb by the reading pointer.

Figure 3:
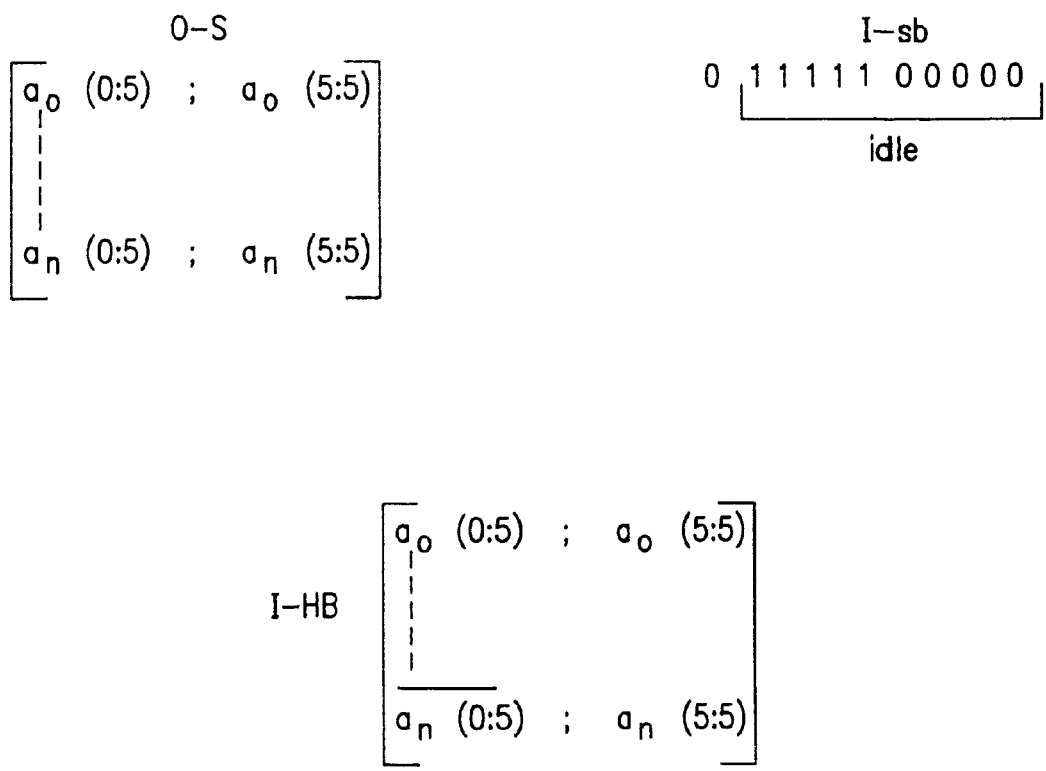
FIG. 3 represents the content of the history buffer HB derived from the transmitted information o-s and the characters of the insertion buffer I-sb.

If these characters are identical and have a value indicated with the label I-sb in FIG. 3, the result of the substitution retrieved in I-HB or as output from the exclusive OR is represented by I-HB in FIG. 3.

Figure 4A:
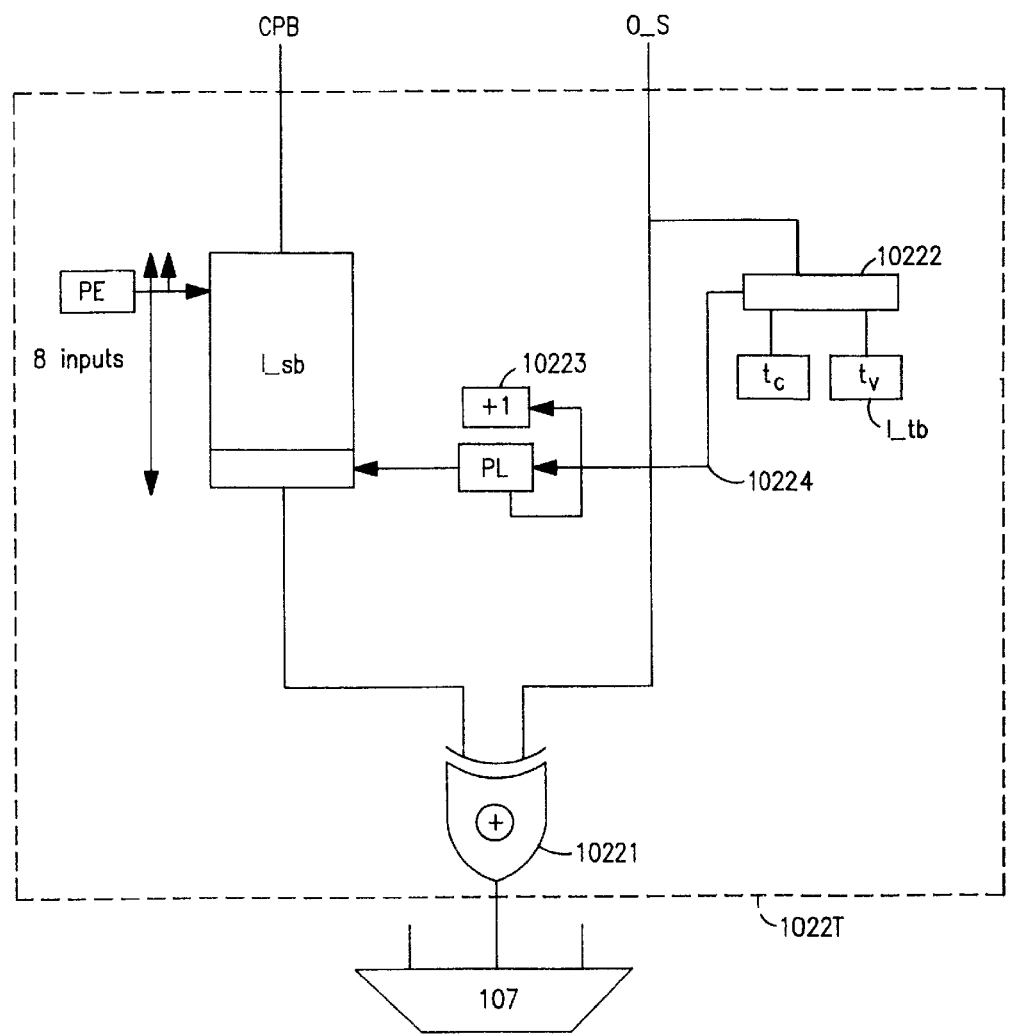
FIG. 4A represents a circuit for substituting error characters.
Figure 4B:
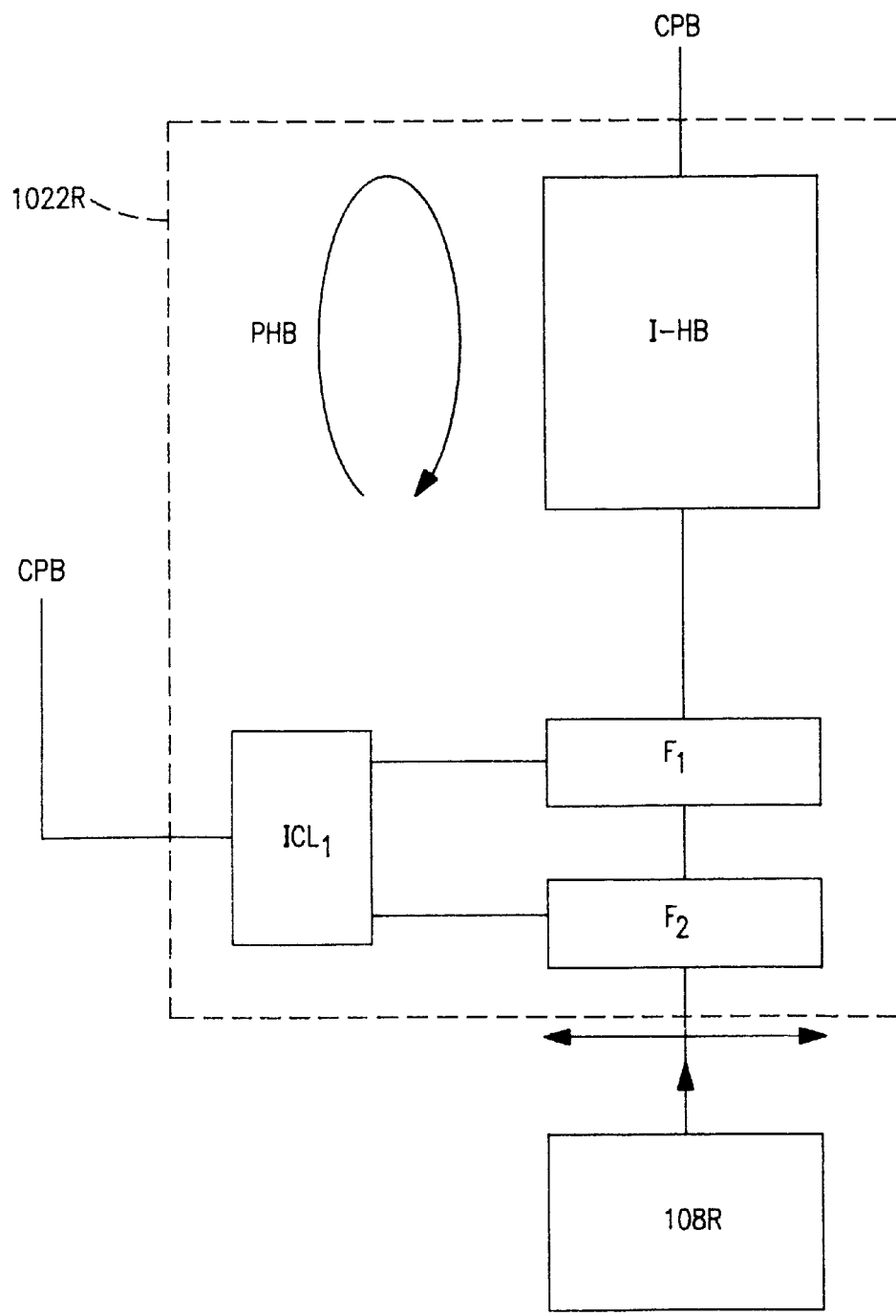
FIG. 4B represents a history circuit.

This activation buffer (I-tb) comprises a piece of information (tv) which participates in the comparison and which, when it has the value 00, indicates that it is not using substitution. In the case where the information (tv) has the value 10, the length of the activation sequence is equal to 1. When tv is equal to 11, the length of the activation sequence is two characters. This substitution circuit is represented in FIG. 4A.

A writing pointer PE which can be accessed by the microprocessor (11a, 11c) through the bus CPB makes it possible to load the substitute characters into the substitution buffer through the bus CPB.

Thus it is possible by means of the substitution circuit to insert errors at the desired moment, and by means of the circuit (CRC) to detect these errors. It is therefore possible, by looping the port back to itself through the link (1090) and the command Ict03, to detect the proper operation of the error detection circuits (CRC). When two ports (10a, 10c) are connected as shown in FIG. 2B, these two ports being connected by the integrated circuits (1a, 1c) to respective microprocessors (11a, 11c), it is possible to carry out an internal self-check comprised of sending via the first processor (11a) a 64-bit write request in which the correct CRC is stored.

The processor (11a) presets the error injecting mechanism of the port (10a) and deliberately inserts a false CRC check character into the message. This character is transmitted by the port (10a) to the port (10c) of the slave integrated circuit (1c) which is itself coupled with a second processor (11c). This port (10c) detects a data error by calculating the CRC of the received message, which does not correspond to the erroneous CRC inserted by the insertion mechanism into the received message. This error detection generates the sending of an interrupt message to the sending circuit (1a), which is received by the processor (11a). This processor (11a) then reads in the circuit of the second port (10c) the CRC value calculated on the transmitted data and deduces whether the CRC circuit has operated properly by verifying whether the stored CRC value corresponds to the received CRC value.

Thus, it is understood that by means of these easy-to-use mechanisms in the input-output port of an integrated circuit, it is possible to detect errors, and to verify the proper operation of the input-output port circuit in a high-speed serial link, thus ensuring the correction of errors, even if the error rate is very low.

The diagnosis of the errors is carried out by reading in the history buffer the events that generate the interruption. This error occurrence also generates the interruption of the communication link to the processor in order to prevent the propagation of the error in the machine.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A device for detecting high-level errors with an integrated self-check on an integrated circuit comprising a serial link control function for constituting an input-output port (109) between a parallel bus (L2CB, C2LB) and a serial link, said integrated circuit including a serializer circuit ($109_T$) on output and a deserializer circuit ($109_R$) on input, the invention comprising an insertion buffer (I-sb) having an output connected to one input of a two input exclusive OR operation, a second input of the exclusive OR operation adapted to receive a piece of information to be transmitted (o-s) in order to constitute, with insertion information issuing from the insertion buffer, a substitute information, and an additional buffer (I-tb) for comparing a first sequence corresponding to the information to be transmitted to the second input of the exclusive OR operation with a second sequence (tc) stored in the additional buffer (I-tb) in order to enable the transmission of the substitute sequence.

2. The device according to claim 1, characterized in that port (109) comprises at least one incoming buffer (TDBUF) for data to be transmitted from the parallel bus and at least one outgoing buffer (RDBUF) for data to be received, and includes, between the at least one incoming buffer (TDBUF) and the outgoing serializer circuit, and between the at least one outgoing buffer (RDBUF) and the incoming deserializer, respectively, a CRC code generating circuit for each respective transmitting part and a CRC code checking circuit for each respective receiving part.

3. The device according to claim 1, characterized in that a serially transmitting 9/12 encoder circuit is coupled with the serializer circuit ($109_T$), and a receiving 9/12 decoder circuit is coupled with the deserializer circuit ($109_R$) so as to transform a normal 9-bit character and a control character into 12-bit code which, on reception, allows the extraction of the clock signal and an idle DC component from the transmission.

4. The detecting device according to claim 1, characterized in that the additional buffer (I-tb) stores a validity bit (tv) in addition to the second sequence (tc) to be compared.

5. The device according to claim 4 characterized in that the port (109) comprises a serial link (1090) which loops the output of the serializer circuit ($109_T$) back to the input of the deserializer circuit ($109_R$), said serial link being validated by a loop command entry supplied by a control register.

6. The detecting device according to claim 4, characterized in that the second sequence to be compared (tc) is an idle character or an idle message.

7. The device according to claim 6 characterized in that the port (109) comprises a serial link (1090) which loops the output of the serializer circuit ($109_T$) back to the input of the deserializer circuit ($109_R$), said serial link being validated by a loop command entry supplied by a control register.

8. The device according to claim 4, characterized in that the second sequence (tc) to be compared is either control characters such as the starts of frame, the ends of frame, tokens, or all the non-idle characters.

9. The device according to claim 8 characterized in that the port (109) comprises a serial link (1090) which loops the output of the serializer circuit ($109_T$) back to the input of the deserializer circuit ($109_R$), said serial link being validated by a loop command entry supplied by a control register.

10. The device according to claim 1 characterized in that the port (109) comprises a serial link (1090) which loops the output of the serializer circuit ($109_T$) back to the input of the deserializer circuit ($109_R$), said serial link being validated by a loop command entry supplied by a control register.

11. The device according to claim 10, characterized in that the serializer and deserializer circuits run at 1 gigabaud, the speed of the serial link.

12. The device according to claim 10, characterized in that a serially transmitting 9/12 encoder circuit is coupled with the serializer circuit ($109_T$), and a receiving 9/12 decoder circuit is coupled with the deserializer circuit ($109_R$) so as to transform a normal 9-bit character and a control character into 12-bit code which, on reception, allows the extraction of the clock signal and an idle DC component from the transmission.

13. The device according to claim 10, characterized in that the port (109) comprises an output from the deserializer circuit ($109_R$), a history buffer (1022) for storing either control characters such as the starts of frame, the ends of frame, tokens, or all the non-idle characters.

14. The device according to claim 13, characterized in that the characters stored in the history buffer (1022) are used by the integrated circuit to determine the cause of a detected error, or to verify that an error detecting mechanism is operational.

15. The device according to claim 10, characterized in that port (109) comprises at least one transmitting buffer (TDBUF) of data to be transmitted issuing from the parallel bus, or receiving buffer (RDBUF) of data to be received, and between the transmitting buffer (TDBUF) and the outgoing serializer circuit, or respectively between the receiving buffer (RDBUF) and the incoming deserializer circuit, for respectively transmitting part of a CRC code generating circuit, or for the receiving part of a CRC code checking circuit.

16. The device according to claim 15, characterized in that the CRC generating circuit delivers a 16-bit word by using a parallel algorithm to calculate the CRC after a shift corresponding to control of a nine-bit byte.

17. The device according to claim 15, characterized in that the data transmitting buffer (TDBUF) or data receiving buffer (RDBUF) run on a specific system clock having a frequency corresponding to that of the internal bus of the integrated circuit.

18. A process for detecting errors in a high-speed serial-parallel communication port and a CRC circuit comprising an error injecting mechanism, the improvement of;

sending to the communication port a piece of information to be transmitted;

calculating the CRC from the information to be transmitted and storing the CRC corresponding to the information to be transmitted;

generating a piece of erroneous information by enabling the error injecting mechanism and transmitting the erroneous information to an integrated circuit equipped with the same type of port;

detecting data errors by means of the CRC checking circuit of the receiving port;

sending an interrupt message to the integrated circuit of the transmitting port; and reading, by means of a microprocessor connected to the parallel bus of the transmitting port, the value calculated by the CRC circuit of the receiving port; and comparing the stored value to the read value.

19. The process for detecting errors according to claim 18, characterized in that the process comprises looping the output of a transmitting serializer circuit (109$_T$) back to the input of a receiving deserializer circuit (109$_R$) of the same port of the integrated circuit.

20. The process according to claim 18, characterized in that the error-injecting mechanism further comprises:

storing, in an injection buffer (I-sb), injection information to be combined with transmitted information so as to generate an error;

loading an activation buffer (I-tb) of the injecting mechanism comprising a sequence of one or two characters; and substituting substitute information resulting from the combination of the transmitted information with the injection information as soon as the combined information corresponds to the information from the activation buffer.

21. The process according to claim 20, characterized in that the length of the substitution sequence is limited to 8 characters.

* * * * *

UNITED STATES PATENT AND TRADEMARK OFFICE
CERTIFICATE OF CORRECTION

PATENT NO. : 6,173,423 B1
DATED : January 9, 2001
INVENTOR(S) : Autechaud et al.

It is certified that error appears in the above-identified patent and that said Letters Patent is hereby corrected as shown below:

Title page,
Item [57], ABSTRACT,
The Abstract should be substituted in its entirety with the following, correct Abstract:

-- A device for detecting errors with an integrated self-check, on an integrated circuit comprising a serial link control function for constituting an input-output port (109) between a parallel bus (L2CB, C2LB) and a serial link, said integrated circuit comprising a serializer circuit ($109_T$) on output and a deserializer circuit ($109_R$) on input, characterized in that an insertion buffer (I-sb) has each of its outputs connected to an exclusive OR operation with two inputs, each second input of which receives a piece of information to be transmitted (o-s) in order to constitute, with the insertion information issuing from the insertion buffer, a piece of substitute information, an additional buffer (I-tb) makes it possible to compare the information transmitted with a sequence stored in the additional buffer (I-tb) in order to enable the transmission of the substitute sequence, and a history buffer HIB of the characters received makes it possible to diagnose the error. --

Signed and Sealed this

Thirtieth Day of July, 2002

Attest:

JAMES E. ROGAN
Attesting Officer        Director of the United States Patent and Trademark Office